J. W. HAIR.
WEDGE FOR TOOL HANDLES.
APPLICATION FILED SEPT. 12, 1907.
905,069.
Patented Nov. 24, 1908.
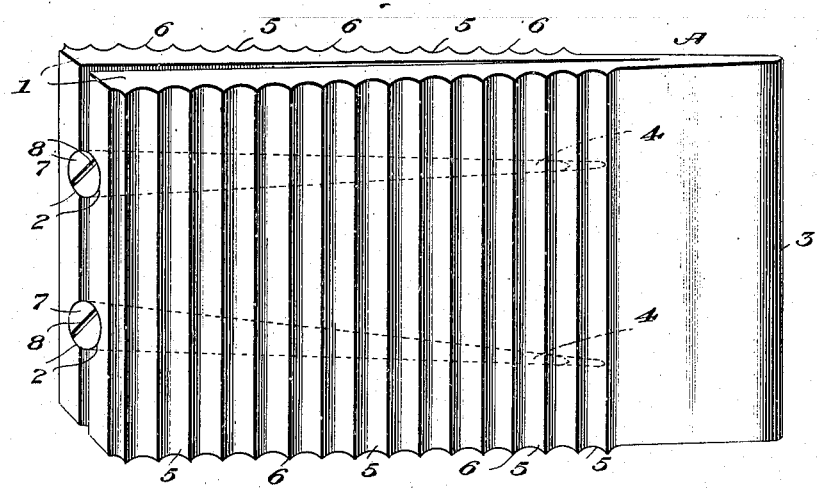
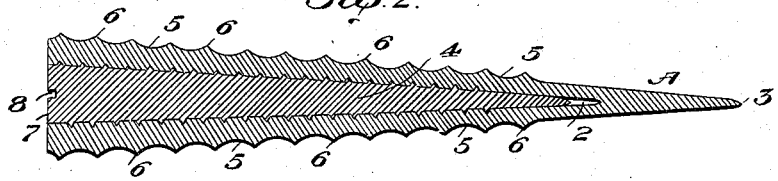

UNITED STATES PATENT OFFICE.

JOHN W. HAIR, OF HEBER, CALIFORNIA.

WEDGE FOR TOOL-HANDLES.

No. 905,069.  Specification of Letters Patent.  Patented Nov. 24, 1908.

Application filed September 12, 1907. Serial No. 392,532.

*To all whom it may concern:*

Be it known that I, JOHN W. HAIR, a citizen of the United States, residing at Heber, in the county of San Diego and State of California, have invented certain new and useful Improvements in Wedges for Tool-Handles, of which the following is a specification.

My invention relates to an improvement in wedges for tool handles, the object being to provide means for holding the head or tool which fits or is received over the end of the handle.

My invention relates to certain other features of construction and combination of parts, which will be more fully described hereinafter and pointed out in the claims.

In the accompanying drawings Figure 1 is a view in perspective; Fig. 2 is a longitudinal section view, and Fig. 3 is a view of the screw.

A represents the wedge made of heavy metal having a certain amount of flexibility, and 1, 1 are the wings, which are made in one piece or in two pieces molded or otherwise fastened together at the bottom so that they form an integral part. The wedge is larger at the top and tapers to a point, as at 3, which is made sharp so as to be driven into the end of a handle.

The inner faces of the wings are provided with grooves 2, 2, which taper toward the bottom of the wedge and are made screw threaded to receive the screw 4, which conforms to the shape of the grooves 2, 2. The outer faces of the wings are provided with transverse grooves 5 forming sharp blades or ribs 6, which are pressed against the wood and sink therein as the screw is forced or screwed into the wedge. The head 7 of screw 4 is made flush with the body, and is provided with a recess or opening 8 therein for the reception of the screw-driver for forcing it or screwing it into the groove 2 of the wedge, whereby by the flexibility of the wedge the wedge can be expanded to the required amount to prevent the head of the tool from slipping off the handle, and by the blades or ribs 6, which grip into the wood of the handle, will prevent the wedge from slipping even in the slightest degree.

The wedge can be made so that the wings are only provided with a single groove, that is, a groove on each wing for a single screw, but I have shown the wedge capable of using two screws.

Another advantage is that the screw 4 is of less length than the grooves 2, 2, so that when the outer end of the screw is flush with the end of the wedge it can be turned or screwed in the grooves for tightening or loosening the wedge in the handle.

It is evident that slight changes might be made in the form and arrangement of the several parts herein described without departing from the spirit and scope of my invention, and hence I do not wish to limit myself to the exact construction herein set forth; but:

Having fully described my invention, and what I desire to secure by Letters Patent is:

1. As an article of manufacture, a combination wedge for tools, which comprises a member split edge-wise throughout the greater portion of its length and a tapering member having a thread, said member adapted to enter between the split portions of the first mentioned member and be turned therein, whereby said tapering member is fed endwise and has the effect of spreading the parts of the split member laterally and evenly approximately throughout their entire length.

2. As an article of manufacture, a combination wedge for tools, which comprises a member split edge-wise throughout the greater portion of its length, said split portions being transversely grooved or corrugated on their outer surfaces, tapering members having threads, said members adapted to enter between the split portions of the first mentioned member and be turned therein, whereby said tapering members are fed endwise and have the effect of spreading the parts of the split member laterally and evenly approximately throughout their entire length.

In testimony whereof I affix my signature in presence of two witnesses.

JOHN W. HAIR.

Witnesses:
W. B. VROMAN,
PERCY HIGHT.